United States Patent
Buskens et al.

(10) Patent No.: US 7,386,556 B2
(45) Date of Patent: Jun. 10, 2008

(54) SUBSTITUTE MANAGER COMPONENT THAT OBTAINS STATE INFORMATION OF ONE OR MORE SOFTWARE COMPONENTS UPON FAILURE OF A FIRST MANAGER COMPONENT

(75) Inventors: Richard W. Buskens, Robbinsville, NJ (US); Oscar J. Gonzalez, Bridgewater, NJ (US); Li Kuang, Lisle, IL (US); Tim T. Liim, Holmdel, NJ (US); Sunil K. Mishra, Aurora, IL (US); Yansong J. Ren, Aberdeen, NJ (US); Muhammad A. Siddiqui, Monmouth Junction, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 597 days.

(21) Appl. No.: 10/868,472

(22) Filed: Jun. 14, 2004

(65) Prior Publication Data
US 2005/0278701 A1    Dec. 15, 2005

(51) Int. Cl.
*G06F 17/30* (2006.01)
(52) U.S. Cl. .................... 707/10; 707/104.1
(58) Field of Classification Search ............ 707/1–10, 707/100–104.1, 200–206; 714/4, 15, 23; 709/201, 223, 115; 718/1
See application file for complete search history.

(56) References Cited

U.S. PATENT DOCUMENTS

| 6,636,982 | B1 * | 10/2003 | Rowlands ........................ 714/4 |
| 6,769,008 | B1 * | 7/2004 | Kumar et al. ................ 709/201 |
| 6,883,170 | B1 * | 4/2005 | Garcia ........................... 718/1 |
| 6,950,833 | B2 * | 9/2005 | Costello et al. ............. 707/201 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner*—Wu Yicun

(57) ABSTRACT

An apparatus in one example comprises a substitute manager component that upon failure of a first manager component, obtains management responsibility for a distributed software application from the first manager component and queries one or more software components of the distributed software application for state information of the one or more software components. The substitute manager component employs the state information to determine whether one or more recovery actions are needed for the distributed software application to recover from the failure of the first manager component.

20 Claims, 2 Drawing Sheets

SUBSTITUTE MANAGER COMPONENT THAT OBTAINS STATE INFORMATION OF ONE OR MORE SOFTWARE COMPONENTS UPON FAILURE OF A FIRST MANAGER COMPONENT

CROSS-REFERENCE TO RELATED APPLICATIONS

This application contains subject matter that is related to the subjcet matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., patent application Ser. No. 10/868,128, co-filed herewith;

"SELECTNG A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et at., patent application Ser. No. 10/868,404, co-filed herewith;

"SOFTWARE COMPONENT INITIALIZATION IN AN ORDERED SEQUENCE," by Buskens, et al., patent application Ser. No. 10/867,945, co-filed herewith;

"SHUTTING DOWN A PLURALITY OF SOFTWARE COMPONENTS IN AN ORDERED SEQUENCE," by Buskens, et al., patent application Ser. No. 10/868,142, co-filed herewith;

"DISTRIBUTED SOFTWARE APPLICATION SOFTWARE COMPONENT RECOVERY IN AN ORDERED SEQUENCE," by Buskens, et al., patent application Ser. No. 10/867,590, co-filed herewith;

"MANAGER COMPONENT FOR CHECKPOINT PROCEDURES," by Buskens, et al., patent application Ser. No. 10/868,127, co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., patent application Ser. No. 10/868,469, co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., patent application Ser. No. 10/867,946, co-filed herewith;

"MANAGER COMPONENT RESOURCE ADDITION AND/OR RESOURCE REMOVAL ON BEHALF OF DISTRIBUTED SOFTWARE APPLICATION," by Gong, et al., patent application Ser. No. 10/868,144, co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The software applications may comprise management software and in one example backup copies of the management software. If the management software fails, then one of the backup copies of the management software becomes active and substitutes for the failed management software.

Prior to a failure of the management software of the software application, the management software performs frequent periodic check pointing of its view of the state of all software components of the software application. The management software stores the state of all software components to stable storage. Upon a failure of the management software, the backup management software component accesses the stored state information and assumes that the most recent copy of the state information is correct. The backup management software may use state information of the software application acquired prior to the failure. As one shortcoming, the state information may have changed since the last check pointing of the state information before the failure.

To save the state of the software components in case of a failure, the management software and/or the software components are continuously interrupted during normal operation. The frequent periodic check pointing of the state of all software components wastes time and resources of the management software and/or the software components. As another shortcoming, the time and resources used to save the state of the software components could otherwise be used for operation of the software application.

Thus, a need exists for management software that obtains accurate state information of a software application for use during recovery from failure. A further need exists for a reduction in a number of interruptions of management software and/or software components to obtain the state information for recovery.

SUMMARY

Software applications may be distributed among a plurality of executables. Each of the executables contains one or more software components. A management infrastructure comprises one or more manager components that handle the management operations on behalf of the software application. Upon failure of a first manager component of the management infrastructure, a substitute manager component is promoted to active duty and takes over the management responsibility from the first manager component. Upon promotion to active duty, the substitute manager component queries each software component of the software application to determine the state of each software component. For example, if a software component is up and running, then the software component is in a system ready state. The substitute manager component compares the acquired state information with a configuration file to determine what recovery activity is needed to recover the software application from the failure of the first manager component.

In one embodiment, there is provided an apparatus comprising a substitute manager component that upon failure of a first manager component, obtains management responsibility for a distributed software application from the first manager component and queries one or more software components of the distributed software application for state information of the one or more software components. The substitute manager component employs the state information to determine whether one or more recovery actions are needed for the distributed software application to recover from the failure of the first manager component.

In another embodiment, there is provided a method for: inheriting management responsibility for a distributed software application upon failure of a first manager component; querying one or more software components of the distributed software application for state information of the one or more software components; and comparing the state information with a configuration file that comprises an indication of a desired architecture of the distributed software application to determine whether one or more recovery actions are needed for the distributed software application to recover from the failure of the first manager component.

In yet another embodiment, there is provided an apparatus comprising a high availability infrastructure in communication with a distributed software application. Upon failure of a first manager component, of the high availability infrastructure, a substitute manager component, of the high availability infrastructure, gains management responsibility for the distributed software application and queries one or more software components of the distributed software application for state information of the one or more software components. The substitute manager component employs the state information to determine whether one or more recovery actions are needed for the distributed software application to recover from the failure of the first manager component.

DESCRIPTION OF THE DRAWINGS

Features of exemplary implementations of the invention will become apparent from the description, the claims, and the accompanying drawings in which:

DETAILED DESCRIPTION

Figure 1:
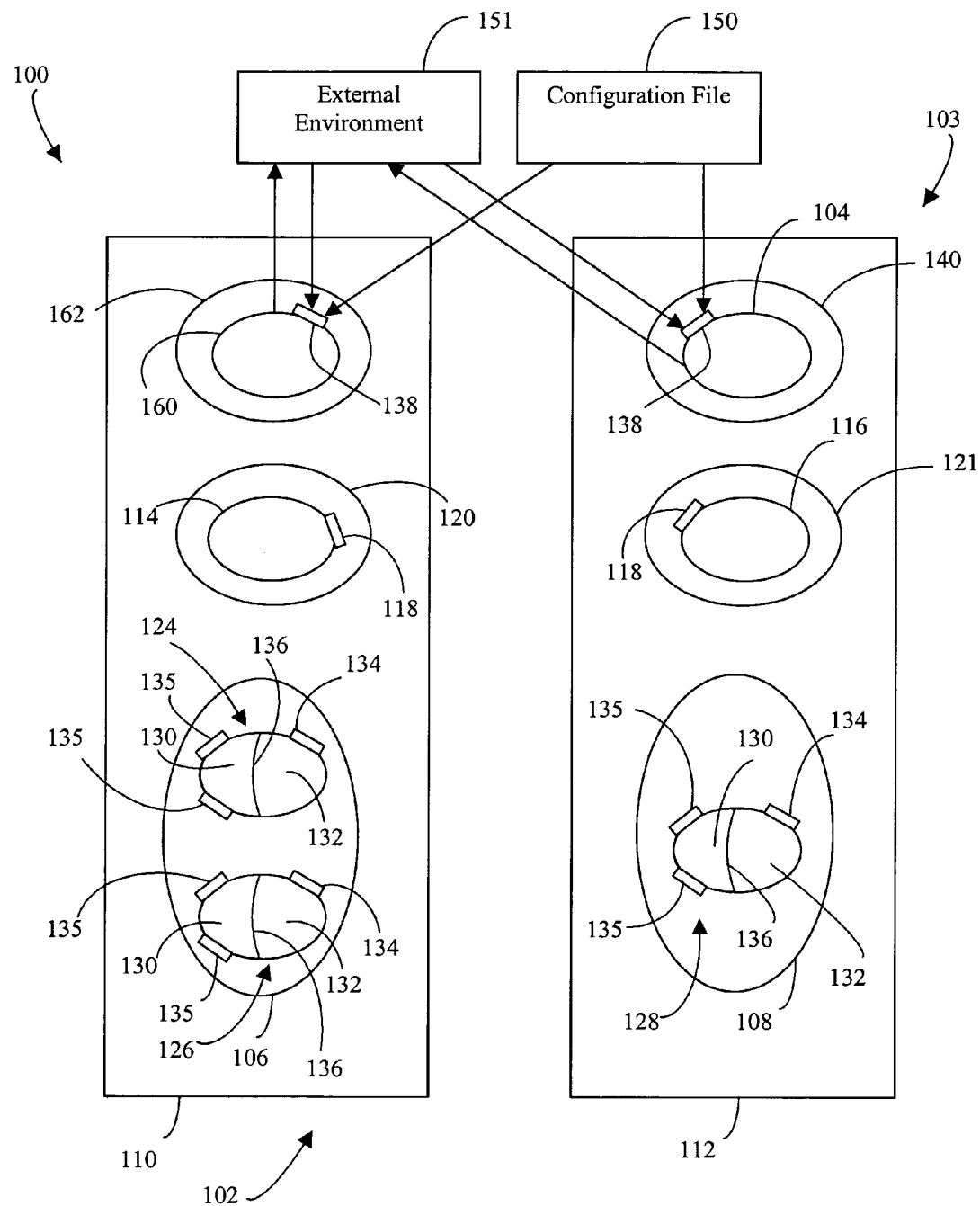
FIG. 1 is a representation of an exemplary implementation of an apparatus that comprises a distributed software application and a management infrastructure.

Turning to FIG. 1, an apparatus 100 in one example comprises a distributed software application 102 and a management infrastructure 103. The management infrastructure 103 performs one or more management operations on the distributed software application 102. The management infrastructure 103 comprises a manager component 104. For example, the manager component 104 may be responsible for one or more of starting, stopping, initializing, shutting down, and monitoring the distributed software application 102, detecting failures of the distributed software application 102, recovering the distributed software application 102, propagating state changes about distributed software application 102, and the like.

The distributed software application 102 represents a software application divided among a plurality of executables (i.e., software capsules or software entities). For example, the distributed software application 102 comprises a plurality of executables 106 and 108. The distributed software application 102 may comprise one or more additional executables (e.g., analogous to the executables 106 and 108). The distributed software application 102 may provide any functionality for a computer system. The distributed software application 102 in one example comprises a call processing software application. For example, the distributed software application 102 sets up and/or tears down telecommunication sessions in a telecommunication network.

The distributed software application 102 may run on a single central processing unit ("CPU") or may be divided between multiple CPUs. For example, the executable 106 may run on processor 110 and the executable 108 may run on processor 112. The processor 110 comprises an executable manager 114 and the processor 112 comprises an executable manager 116. The executable managers 114 and 116 in one example are part of the management infrastructure 103.

The executable managers 114 and 116 monitor executables of the distributed software application 102 that run on the processors 110 and 112, such as the executables 106 and 108. For example, the executable managers 114 and 116 monitor communication channels and/or diagnostics on behalf of the executables 106 and 108. Should one or more of the executables 106 and 108 fail, the respective one of the executable managers 114 and 116 informs the manager component 104 of the failure.

Each of the executable managers 114 and 116 comprise a communication interface 118 for communication with the manager component 104. The executable managers 114 and 116 receive instruction from the manager component 104. For example, the executable managers 114 and 116 may receive instructions at the communication interface 118 from the manager component 104. The executable manager 114 is encapsulated in an executable 120 running on the processor 110 and the executable manager 116 is encapsulated in an executable 122 running on the processor 112.

The executables 106 and 108 comprise one or more software components 124, 126 and 128. For example, the executable 106 encapsulates the software components 124 and 126 and the executable 108 encapsulates the software component 128. Within each of the executables 106 and 108 may be tens, hundreds, or even thousands of other software components (e.g., analogous to the software components 124, 126 and 128).

The software components 124, 126 and 128 represent software sub-entities of the executables 106 and 108. For example, the software components 124, 126 and 128 represent logical blocks of software of the executables 106 and 108. The software components 124 and 126 in one example are developed independently and encapsulated together within the executable 106. The software components 124, 126 and 128 each perform some portion of the overall functionality of the distributed software application 102. The software components 124, 126 and 128 work together to make the distributed software application 102 achieve the desired operation.

Each of the software components 124, 126 and 128 comprise application software 130, management support software 132, a management support software communication interface 134, and one or more application software communication interfaces 135. The software components 124, 126 and 128 employ the management support software communication interfaces 134 to receive communications from the manager component 104. The software components 124, 126 and 128 employ the application software communication interfaces 135 to receive communications from other software components of the software components 124, 126 and 128. An application programming interface ("API") 136 communicatively couples the application software 130 with the management support software 132 in each of the software components 124, 126 and 128. The application software 130 and the management support software 132 can exchange information through the application programming interface 136.

The application software 130 is the portion of the software components 124, 126 and 128 that performs some portion of the overall functionality of the distributed software application 102. The management support software 132 is the portion of the software components 124, 126 and 128 that cooperates with the manager component 104 to perform management operations on the software components 124, 126 and 128. The application software 130 is part of the distributed software application 102 and the management support software 132 is part of the management infrastructure 103.

An application developer creates the application software 130 of the software components 124, 126 and 128 to achieve the designated functionality of the software components 124, 126 and 128. For example, the application developer creates the application software 130 of the software components 124, 126 and 128 to achieve the overall functionality of the distributed software application 102.

To alleviate the application developers from being required to write software into each of the software components 124, 126 and 128 for the management operations, a code generator in one example automatically generates the management support software 132. The manager component 104, the executable managers 114 and 116, and the management support software 132 cooperate to perform the management operations on the software components 124, 126 and 128.

The manager component 104 controls management operations for the distributed software application 102 on behalf of the distributed software application 102. One advantage to the manager component 104 controlling the management operations of the distributed software application 102 is that the manager component 104 alleviates application developers from being required to write software into each of the software components 124, 126 and 128 to perform the management operations. The manager component 104 controls management operations of the software components 124, 126 and 128 on behalf of the software components 124, 126 and 128. For example, the manager component 104 interfaces with the management support software 132 coupled with the application software 130 in the software components 124, 126 and 128 to control the management operations of the software components 124, 126 and 128. Therefore, the manager component 104 saves the application developers the effort of creating software to perform the management operations.

The manager component 104 employs information from a configuration file 150 during management of the distributed software application 102. The configuration file 150 is created to store connection information and/or architecture information of the distributed software application 102. The configuration file 150 in one example provides the manager component 104 with information about the set of executables 106 and 108, the number of each type of the executables 106 and 108, the mapping of the software components 124, 126 and 128 to the executables 106 and 108, the types of the software components 124, 126 and 128, and the number of each type of the software components 124, 126 and 128 in each of the executables 106 and 108.

To create the management support software 132, the configuration file 150 in one example is input into the code generator. The code generator creates code for the management support software 132. The code for the management support software 132 is compiled and linked with the application software 130 in the software components 124, 126 and 128. The management support software 132 may be different for each of the software components 124, 126 and 128, as will be appreciated by those skilled in the art.

The manager component 104 comprises a communication interface 138 for receiving incoming communications. The communication interface 138 is employable for receiving the configuration file 150 for use with the distributed software application 102. The manager component 104 may employ other means to receive the configuration file 150, such as reading the configuration file 150 directly from a disk or file system. The communication interface 138 may also receive communications from the executable managers 114 and 116, as well as communications from the software components 124, 126 and 128.

The manager component 104 may also use the communication interface 138 for receipt of external system information from an external environment 151. In one example, the external environment 151 represents other components of the system that are in communication with the manager component 104. In another example, the external environment 151 represents another management infrastructure in communication with the management infrastructure 103.

The manager component 104 is encapsulated with zero or more other software components in an executable 140. The executable 140 that contains the manager component 104 is run on one of the processors 110 and 112. The manager component 104 in one example is active and the management infrastructure 103 may have one or more standby manager components, such as a manager component 160. For example, the manager component 160 is analogous to the manager component 104. The manager component 160 in one example is substantially identical to the manager component 104. The manager component 160 in one example comprises a substitute manager component for the manager component 104.

In one example, the manager component 160 is encapsulated with the manager component 104 in the executable 140 running on the processor 112. In another example, the manager component 160 is encapsulated with zero or more other software components in an executable 162 running on the processor 110. Therefore, the active manager component 104 and the standby manager component 160 may run on different processors. The manager components 104 and 160 in one example comprise an active-standby pair. If the manager components 104 and 160 run on different processors and one of the processors 110 and 112 were to fail, then the management infrastructure 103 would still have one of the active-standby pair of the manager components 104 and 160 for operation. For example, if the processor 112 that runs the active manager component 104 goes down, then the standby manager component 160 on the processor 110 would become active.

If the manager component 104 fails, then one of the standby manager components becomes active and gains managerial control of the distributed software application 102. For example, upon failure of the manager component 104, the manager component 160 obtains management responsibility for the distributed software application 102 from the manager component 104. The management infrastructure 103 in one example promotes the manager component 160 to active management of the distributed software application 102. After the promotion to active management, the manager component 160 sends contact information of the manager component 160 to the software components 124, 126 and 128 to indicate to the software components 124, 126 and 128 that the manager component 160 is active.

The software components 124, 126 and 128 may employ the contact information to establish communication with the manager component 160.

In one embodiment, the manager component 104 and the manager component 160 are members of an active-standby set. Before a failure of the manager component 104, the manager component 104 comprises an active member of the active-standby set and the manager component 160 comprises a standby member of the active-standby set. Upon the failure of the manager component 104, the manager component 160 is promoted to be the active member of the active-standby set.

In another embodiment, the management infrastructure 103 runs the manager component 104 until failure of the manager component 104. Upon failure of the manager component 104, the management infrastructure 103 creates and starts another instance of the manager component 104. For example, the management infrastructure 103 starts the manager component 160.

The management infrastructure 103 may also comprise substitute executable managers. For example, the management infrastructure 103 comprises a substitute executable manager for the executable manager 114. Upon failure of the executable manager 114, the substitute executable manager becomes active to supervise the executable 106. The management infrastructure 103 may also comprise a substitute executable manager for the executable manager 116. Upon failure of the executable manager 116, the substitute executable manager becomes active to supervise the executable 108.

The distributed software application 102 may comprise redundant components. For example, the distributed software application 102 may comprise substitute software components for the software components 124, 126 and 128. Upon failure of one of the software components 124, 126 and 128, the respective one of the substitute software components becomes active to perform the responsibility of the failed one of the software components 124, 126 and 128. The distributed software application 102 may also comprise substitute executables for the executables 106 and 108.

In one example, the substitute software components are encapsulated with the respective software components 124, 126 and 128 in the executables 106 and 108. In another example, the substitute software components are encapsulated in separate executables running on separate processors. For example, the software component 124 runs on the processor 110 and the substitute software component for the software component 124 runs on the processor 112. Therefore, the active software component 124 and the standby software component are running on different processors. The software component 124 and the substitute software component in one example comprise an active-standby pair. If one of the processors 110 and 112 were to fail, then the distributed software application would still have one of the active-standby pair of software components for operation. For example, if the processor 110 that runs the active software component 124 goes down, then the standby software component on the processor 112 would become active.

The management infrastructure 103 provides management functionality as a reusable asset for distributed software applications. The management infrastructure 103 in one example comprises a portion of a high availability ("HA") infrastructure. The manager component 104 in one example comprises a high availability manager component operating in a high availability infrastructure. For example, the high availability infrastructure controls management operations on the software components 124, 126 and 128 for the distributed software application 102. The high availability infrastructure is usable to control management operations for the distributed software application 102 or another distributed software application. The high availability infrastructure is able to continue processing while switching between active and standby components in the high availability infrastructure.

Figure 2:
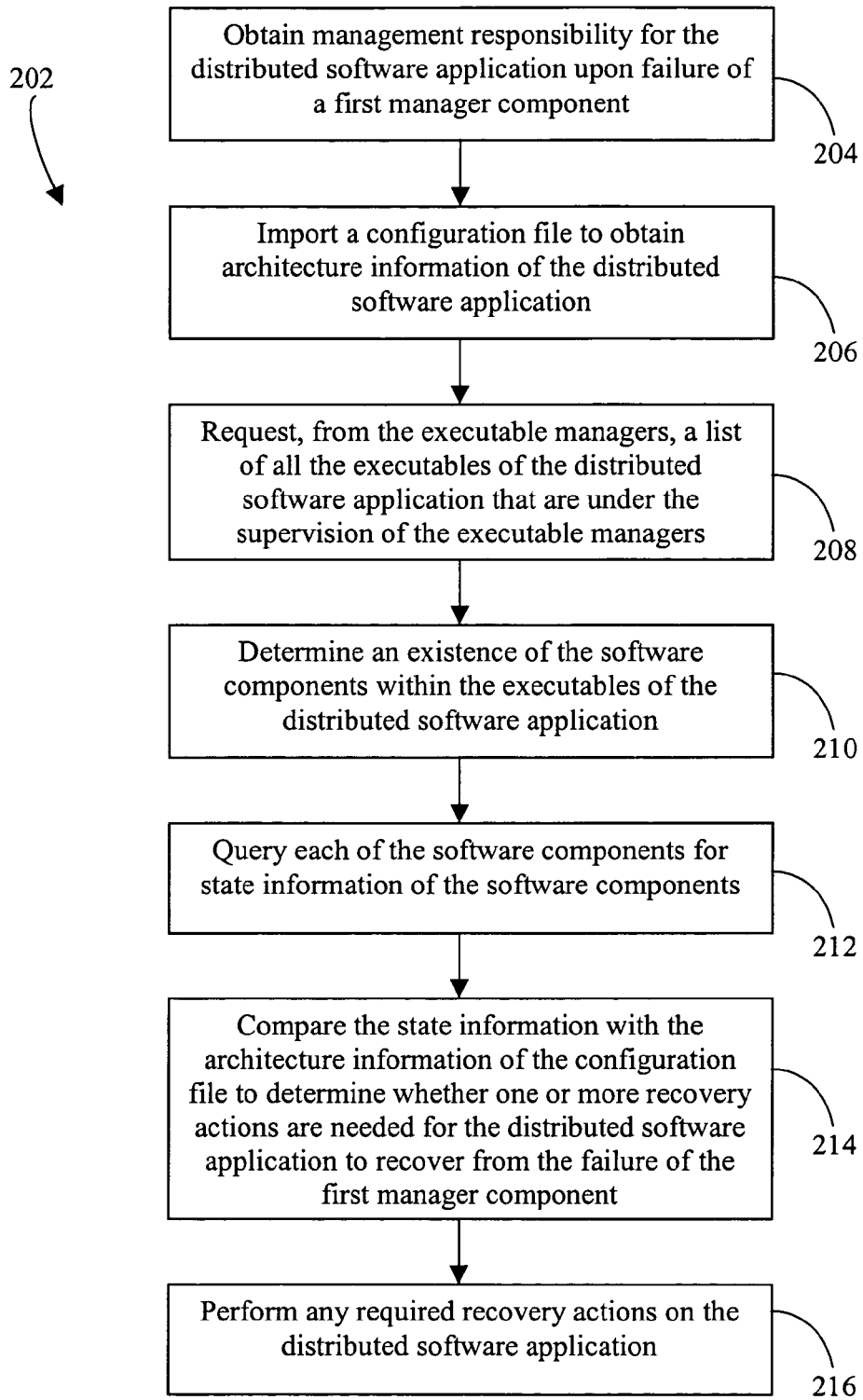
FIG. 2 is a representation of exemplary logic that serves to allow a substitute manager component of the management infrastructure to obtain management responsibility for the distributed software application of the apparatus of FIG. 1.

Turning to FIGS. 1-2, an illustrative description of one exemplary operation of the apparatus 100 is now presented, for explanatory purposes. The manager component 104 of the management infrastructure 103 in one example comprises a high availability manager component operating in a high availability infrastructure. To begin operation of the apparatus 100, the distributed software application 102 is configured for control by the manager component 104. Exemplary logic 202 serves to allow a substitute manager component of the management infrastructure 103 to obtain management responsibility for the distributed software application 102. The logic 202 employs one or more steps, for example, STEPS 204, 206, 208, 210, 212, 214 and 216. The manager component 160 in one example performs the STEPS 204, 206, 208, 210, 212, 214 and 216 of FIG. 2.

The manager component 104 in one example initially has management responsibility for the distributed software application 102. Upon failure of the manager component 104, the management infrastructure 103 needs to recover from the failure and reassign the management responsibility for the distributed software application 102 to a substitute manager component, such as the manager component 160. At STEP 204, the manager component 160 in one example obtains the management responsibility for the distributed software application 102 from the manager component 104. For example, the management infrastructure 103 may promote the manager component 160 from standby to active operation.

After the manager component 160 obtains management responsibility for the distributed software application 102, the manager component 160 determines whether the distributed software application 102 requires any recovery operations to recover from the failure of the manager component 104. For example, the manager component 160 determines whether the failure of the manager component 104 left the distributed software application 102 in a non-operational state.

At STEP 206, once the manager component 160 gains management responsibility for the distributed software application 102, the management component 160 imports the configuration file 150 to obtain architecture information of the distributed software application. In one embodiment, the manager component 160 imports the configuration file 150 upon obtaining management responsibility for the distributed software application 102. In another embodiment, the manager component 160 imports the configuration file 150 before the failure of the manager component 104 and upon obtaining the management responsibility, the manager component 160 checks whether the configuration file 150 has changed. In yet another embodiment, the manager component 160 periodically checks whether the configuration file 150 has changed. If the configuration file 150 has changed, the manager component 160 rereads the configuration file 150.

Next, the manager component 160 begins a discovery operation on the distributed software application 102 to learn the state of each of the software components 124, 126 and 128 of the distributed software application 102. To begin the discovery operation, the manager component 160 determines an existence of the executable managers 114 and 116 in the management infrastructure 103. At STEP 208, the manager component 160 requests, from the executable managers 114 and 116, a list of all the executables of the distributed software application 102 that are under the supervision of the executable managers 114 and 116. The executable manager 114 in one example indicates to the manager component 160 that the executable manager 114 supervises the executable 106. The executable manager 116 in one example indicates to the manager component 160 that the executable manager 116 supervises the executable 108.

The configuration file 150 is created to comprise an indication of the number and type of all software components within each of the executables 106 and 108. At STEP 210, by importing information from the configuration file 150, the manager component 160 determines that the executables 106 and 108 encapsulate the software components 124, 126 and 128. For example, the manager component 160 employs the list of executables from the executable managers 114 and 116 and information from the configuration file 150 to determine an existence of the software components 124, 126 and 128.

At STEP 212, the manager component 160 queries each of the software components 124, 126 and 128 for state information of the software components 124, 126 and 128. For example, the manager component 160 sends a message to the management support software 132 of each of the software components 124, 126 and 128 to request the state of the software components 124, 126 and 128. The software components 124, 126 and 128 return the state information to the manager component 160. If the software components 124, 126 and 128 are running and don't require any recovery actions, the software components 124, 126 and 128 are in a system ready state.

Having the manager component 160 obtain the state information of the software components 124, 126 and 128 after the failure of the manager component 104 serves to allow the manager component 160 access to current state information of the distributed software application 102. For example, one or more of the software components 124, 126 and 128 may have changed state since before the failure of the manager component 104. Obtaining the state information after the manager component 160 gains management responsibility for the distributed software application 102 promotes accuracy in the state information. For example, the state information obtained after the manager component 160 gains management responsibility reflects any changes to the state of the software components 124, 126 and 128 due to the failure of the manager component 104 or concurrent failures of the software components 124, 126 and 128. Therefore, the state information may be used to accurately determine whether any recovery actions are needed for the distributed software application 102 to recover from the failure of the manager component 104.

In one embodiment, the manager component 104 may periodically save the state of the software components 124, 126 and 128 before the failure of the manager component 104. In another embodiment, the manager component 104 may periodically save the state of the software components 124, 126 and 128 before the failure of the manager component 104 and the manager component 160 may also obtain the state of the software components 124, 126 and 128 after the failure.

In yet another embodiment, the manager component 160 obtains the state of the software components 124, 126 and 128 from the software components 124, 126 and 128 after the failure of the manager component 104 without prior state information saving by the manager component 104. Querying the state of the software components 124, 126 and 128 interrupts the operation of the software components 124, 126 and 128. Therefore, querying the software components 124, 126 and 128 only after the failure of the manager component 104 serves to reduce a number of interruptions to the software components 124, 126 and 128 to obtain accurate state information of the software components 124, 126 and 128.

Periodically saving the state of the software components 124, 126 and 128 also interrupts the operation of the manager components 104 and 160. Only querying the state of the software components 124, 126 and 128 when the state information is needed to recover from a failure of one of the manager components 104 and 160 serves to reduce a number of interruptions to the operation of the manager components 104 and 160. For example, the time and resources needed to periodically save the state of the software components 124, 126 and 128 can be used for operation of the distributed software application 102.

The configuration file 150 indicates a desired architecture of the distributed software application 102. The manager component 160 employs the indication of the desired architecture to determine a list of software components that should be present and active in the distributed software application 102. At STEP 214, the manager component 160 compares the state information obtained from the software components 124, 126 and 128 with the list of software components that should be present to determine if each of the software components 124, 126 and 128 on the list of software components is in the system ready state.

In one example, all of the software components 124, 126 and 128 respond to the manager component 160 with an indication of the system ready state. Therefore, the manager component 160 determines that each of the software components 124, 126 and 128 are running correctly and additional recovery actions may not be necessary. In another example, all of the software components 124, 126 and 128 are in a non-ready state. Therefore, the manager component 160 determines that the distributed software application 102 may need to be reinitialized to run correctly. In yet another example, one or more of the software components 124, 126 and 128 respond to the manager component 160 with an indication of the system ready state and one or more of the software components 124, 126 and 128 are in the non-ready state. Therefore, the manager component 160 determines that additional recovery actions may be necessary for the distributed software application 102 to run correctly.

Upon completion of initialization of the distributed software application 102, the active manager component (e.g., the manager component 104 or the manager component 160) sends a system ready message to each of the software components 124, 126 and 128. Upon receipt of the system ready message, the software components 124, 126 and 128 transition into the system ready state. If the manager component 104 completed initialization of the distributed software application 102 before the failure of the manager component 104, then one or more of the software components 124, 126 and 128 would be in the system ready state.

If the manager component 104 failed during an initialization operation on the distributed software application 102, then the manager component 160 obtains the state information of the software components 124, 126 and 128 and determines that the initialization operation is unfinished. At STEP 216, the manager component 160 performs one or more recovery actions on the distributed software application 102 to recover from the failure of the manager component 104. For example, the manager component 160 undoes the partially completed initialization operation and reattempts a new initialization operation on the distributed software application 102.

During the initialization operation before failure of the manager component 104, the manager component 104 may have created and initialized the software component 124 and failed to initialize the software components 126 and 128. Before retrying the initialization operation, the manager component 160 terminates each of the executables 106 and 108 and the software components 124, 126 and 128. Then, the manager component 160 begins the new initialization operation on the distributed software application. Upon completion of the initialization operation, the manager component 160 sends a system ready message to each of the software components 124, 126 and 128 to update the state information of the software components 124, 126 and 128.

If the manager component 104 failed during a recovery operation on the distributed software application 102 or one or more of the software components 124, 126 and 128 have failed, then the manager component 160 obtains the state information of the software components 124, 126 and 128 and determines that one or more of the software components 124, 126 and 128 need to be recovered. If the state information obtained from the software components 124, 126 and 128 indicates that the software components 126 and 128 are in the system ready state and the software component 124 is not in the system ready state, then the manager component 160 performs one or more recovery actions on the software component 124. In one example, the manager component 104 was attempting to recover the software component 124 before the failure. In another example, the software component 124 failed contemporaneously with manager component 104.

Upon inheriting management responsibility for the distributed software application 102, the manager component 160 initiates a recovery operation on the software component 124. At STEP 216, the manager component 160 performs one or more recovery actions on the distributed software application 102 to recover from the failure of the manager component 104. For example, the manager component 160 may promote one of the substitute software components to active duty to substitute for a respective one of the software components 124, 126 and 128. Then, the manager component 160 may create another substitute software component as a standby for the promoted one of the substitute software components. The recovery operation for an executable or processor is analogous to the recovery operation for a software component, as described herein.

If the manager component 104 failed during a growth operation to add an additional software component to the distributed software application 102, then the manager component detects an existence of a transaction file that indicates a progress of the growth operation. The transaction file in one example comprises a scratch file saved in stable storage. The manager component 104 in one example failed before completion of the growth operation. Therefore, the configuration file 150 was not updated to store a record of the additional software component in the desired architecture of the distributed software application 102. However, the manager component 104 stored the progress of the growth operation in the transaction file.

At STEP 216, the manager component 160 performs one or more recovery actions on the distributed software application 102 to recover from the failure of the manager component 104. For example, the manager component 160 analyzes the transaction file to determine which one or more growth steps are needed to complete the growth operation and integrate the additional software component into the distributed software application 102. In one example, transaction file indicates that the additional software component has been grown physically. Therefore, the manager component 160 creates internal data structures for the additional software component and treats the additional software component as a software component that needs to be recovered. In another example, the transaction file indicates that the additional software component has yet to be grown physically. Therefore, the manager component 160 will trigger a new growth operation for the additional software component. Upon completion of the growth operation, the manager component 160 updates the configuration file 150 to include an indication of the additional software component in the desired architecture of the distributed software application 102. The growth operation for an additional executable or node is analogous to the growth operation for the additional software component, as described herein.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the manager components 104 and 160. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a network comprising or coupled with the apparatus 100 for transmitting a modulated carrier signal, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   one or more computer-readable signal-bearing media that comprise a software program for implementation of:

a management infrastructure for a distributed software application, wherein the management infrastructure is distinct from the distributed software application, wherein the management infrastructure comprises a first manager component and a substitute manager component, wherein the distributed software application comprises one or more software components that run within a plurality of executables;

means in the one or more media for causing the substitute manager component to obtain management responsibility for the distributed software application from the first manager component upon failure of the first manager component and to query one or more software components of the distributed software application for state information of the one or more software components;

wherein the substitute manager component employs the state information to determine whether one or more recovery actions are needed for the distributed software application to recover from the failure of the first manager component;

wherein the substitute manager component is configured to perform the one or more recovery actions to recover from the failure of the first manager component.

2. The apparatus of claim 1, wherein before the failure of the first manager component, the first manager component is responsible for control of one or more management operations on the distributed software application;

wherein after the failure of the first manager component, the substitute manager component is responsible for control of the one or more management operations on the distributed software application.

3. The apparatus of claim 1, wherein the first manager component and the substitute manager component are members of an active-standby set;

wherein before the failure of the first manager component, the first manager component comprises an active member of the active-standby set and the substitute manager component comprises a standby member of the active-standby set;

wherein upon the failure of the first manager component, the substitute manager component is promoted to be the active member of the active-standby set.

4. The apparatus of claim 1, wherein the distributed software application comprises the one or more software components within one or more executables;

wherein after the substitute manager component obtains management responsibility for the distributed software application, the substitute manager component determines an existence of one or more executable managers that supervise the one or more executables;

wherein the substitute manager component requests a list of the one or more executables from the one or more executable managers.

5. The apparatus of claim 4, wherein the substitute manager component employs the list of the one or more executables and information of the one or more executables from a configuration file to determine an existence of the one or more software components;

wherein the substitute manager component sends a message to each of the one or more software components to request the state information of the one or more software components.

6. The apparatus of claim 1, wherein before the failure of the first manager component, the first manager component was performing an initialization operation on the distributed software application;

wherein the first manager component initialized a first software component of the one or more software components and failed to initialize a second software component of the one or more software components;

wherein the substitute manager component obtains the state information of the one or more software components and determines that the initialization operation is unfinished;

wherein the substitute manager component terminates the first and second software components and retries the initialization operation on the distributed software application.

7. The apparatus of claim 6, wherein upon completion of the initialization operation, the substitute manager component sends a system ready message to the one or more software components to update the state information of the one or more software components.

8. The apparatus of claim 1, wherein the substitute manager component obtains the state information of the one or more software components and determines that a first software component, of the one or more software components, has failed;

wherein the substitute manager component initiates a recovery operation on the first software component.

9. The apparatus of claim 1, wherein before the failure of the first manager component, the first manager component was performing a growth operation to add a software component to the distributed software application;

wherein the substitute manager component determines an existence of a transaction file that indicates a progress of the growth operation, wherein the substitute manager component analyzes the transaction file to determine which one or more growth steps are needed to complete the growth operation and integrate the software component into the distributed software application;

wherein upon completion of the growth operation, the substitute manager component updates a configuration file that stores architecture information of the distributed software application to include an indication of the software component.

10. The apparatus of claim 1 wherein the substitute manager component sends contact information of the substitute manager component to the one or more software components to indicate that the substitute manager component is active;

wherein the contact information is employable by the one or more software components to establish communication with the substitute manager component.

11. The apparatus of claim 1, wherein the substitute manager component obtains information of the distributed software application from a configuration file, wherein the substitute manager component employs the information to determine a list of software components that should be present in the distributed software application;

wherein the substitute manager component compares the state information obtained from the one or more software components with the list of software components to determine if each software component on the list of software components is in a system ready state.

12. The apparatus of claim 11, wherein if the state information obtained from the one or more software components indicates that a software component from the list of software components is not in the system ready state, then the substitute manager component performs the one or more recovery actions on the software component not in the system ready state.

13. The apparatus of claim 1, wherein the first manager component comprises a first high availability manager component of a high availability infrastructure, wherein the substitute manager component comprises a substitute high availability manager component of the high availability infrastructure;
  wherein the high availability infrastructure is usable to control management operations for the distributed software application or another distributed software application.

14. The apparatus of claim 1, wherein the distributed software application comprises a call processing software application;
  wherein the substitute manager component controls the one or more recovery actions for the call processing software application to recover from the failure of the first manager component.

15. A method, comprising the steps of:
  inheriting management responsibility for a distributed software application, by a substitute manager component, upon a failure of a first manager component, wherein the substitute manager component and the first manager component are distinct from the distributed software application;
  querying, by the substitute manager component, one or more software components of the distributed software application for state information of the one or more software components; and
  comparing, by the substitute manager component, the state information with a configuration file that comprises an indication of a desired architecture of the distributed software application to determine whether one or more recovery actions are needed for the distributed software application to recover from the failure of the first manager component;
  performing, by the substitute manager component, the one or more recovery actions to recover from the failure of the first manager component.

16. The method of claim 15, wherein the step of querying the one or more software components of the distributed software application for the state information of the one or more software components comprises the steps of:
  determining an existence of one or more executable managers that supervise one or more executables;
  requesting a list of the one or more executables from the one or more executable managers;
  employing the list of the one or more executables and information of the one or more executables from a configuration file to determine an existence of the one or more software components; and
  sending, after the failure of the first manager component, a message to each of the one or more software components to request the state information from the one or more software components.

17. The method of claim 15, wherein before the failure of the first manager component, the first manager component was performing an initialization operation on the distributed software application;
  wherein the step of comparing the state information with the configuration file that comprises the indication of the desired architecture of the distributed software application to determine whether the one or more recovery actions are needed for the distributed software application to recover from the failure of the first manager component comprises the steps of:
  determining, based on the state information, that the initialization operation is unfinished;
  terminating the one or more software components; and
  retrying the initialization operation on the distributed software application.

18. The method of claim 15, wherein before the failure of the first manager component, the first manager component was performing a growth operation to add a software component to the distributed software application;
  wherein the step of comparing the state information with the configuration file that comprises the indication of the desired architecture of the distributed software application to determine whether the one or more recovery actions are needed for the distributed software application to recover from the failure of the first manager component comprises the steps of:
  determining an existence of a transaction file that indicates a progress of the growth operation; and
  analyzing the transaction file to determine which one or more growth steps are needed to complete the growth operation to integrate the software component into the distributed software application.

19. An apparatus, comprising:
  one or more computer-readable signal-bearing media that comprise a software program for implementation of a high availability infrastructure in communication with a distributed software application;
  wherein the high availability infrastructure is distinct from the distributed software application, wherein the high availability infrastructure comprises a substitute manager component and a first manager component;
  wherein the one or more media comprise means for causing the substitute manager component, to gain management responsibility for the distributed software application upon failure of the first manager component, and to query one or more software components of the distributed software application for state information of the one or more software components;
  wherein the substitute manager component employs the state information to determine whether one or more recovery actions are needed for the distributed software application to recover from the failure of the first manager component.

20. The apparatus of claim 19, wherein the substitute manager component obtains information of the distributed software application from a configuration file, wherein the substitute manager component employs the information to determine a list of software components that should be present in the distributed software application;
  wherein the substitute manager component compares the state information obtained from the one or more software components with the list of software components to determine if each software component on the list of software components is in a system ready state;
  wherein if the state information obtained from the one or more software components indicates that a software component from the list of software components is not in the system ready state, then the substitute manager component performs the one or more recovery actions on the software component not in the system ready state.

* * * * *